United States Patent
Matthews et al.

(10) Patent No.: US 12,530,965 B2
(45) Date of Patent: Jan. 20, 2026

(54) ADAS PROVIDING AUGMENTED REALITY WITH DIGITAL GATEWAY INDICATIVE OF YIELDING STATUS OF HOST VEHICLE

(71) Applicant: GM GLOBAL TECHNOLOGY OPERATIONS LLC, Detroit, MI (US)

(72) Inventors: Alexander Matthews, Detroit, MI (US); Joseph F. Szczerba, Grand Blanc, MI (US); Thomas A. Seder, Fraser, MI (US); Robert C. Jablonski, Rochester, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 66 days.

(21) Appl. No.: 18/649,225

(22) Filed: Apr. 29, 2024

(65) Prior Publication Data

US 2025/0336291 A1 Oct. 30, 2025

(51) Int. Cl.
| | |
|---|---|
| G08G 1/0967 | (2006.01) |
| B60K 35/234 | (2024.01) |
| B60K 35/235 | (2024.01) |
| B60K 35/28 | (2024.01) |
| G06T 11/00 | (2006.01) |
| G08G 1/16 | (2006.01) |

(52) U.S. Cl.
CPC ..... *G08G 1/096708* (2013.01); *B60K 35/234* (2024.01); *B60K 35/235* (2024.01); *B60K 35/285* (2024.01); *G06T 11/00* (2013.01); *B60K 2360/177* (2024.01); *B60K 2360/191* (2024.01); *G08G 1/166* (2013.01)

(58) Field of Classification Search
CPC ............ G08G 1/096708; G08G 1/166; B60K 35/234; B60K 35/235; B60K 35/285; B60K 2360/177; B60K 2360/191; G06T 11/00

See application file for complete search history.

(56) References Cited

U.S. PATENT DOCUMENTS

2021/0155159 A1\* 5/2021 Kawate ................. B60K 35/23

\* cited by examiner

*Primary Examiner* — Yuen Wong

(57) ABSTRACT

An assistance system includes: an augmented reality module configured to i) determine a path of a host vehicle, ii) detect one or more objects with one or more trajectories predicted to interfere with the path of the host vehicle, and iii) based on the one or more trajectories, generate a first digital gateway indicative that the host vehicle should yield for the one or more objects; a display control module configured to control an augmented reality head-up display to display the first digital gateway in a closed state over an environment forward of the host vehicle and along the path of the host vehicle; and a vehicle control module configured to yield to the one or more objects as the host vehicle approaches the first digital gateway.

20 Claims, 11 Drawing Sheets

ADAS PROVIDING AUGMENTED REALITY WITH DIGITAL GATEWAY INDICATIVE OF YIELDING STATUS OF HOST VEHICLE

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates to head-up displays (HUDs), and more particularly to HUDs providing an augmented reality (AR) via a windshield of a vehicle.

A driver of a vehicle traditionally views surroundings of the vehicle through windows, windshields, and other glass of the vehicle. The driver may control vehicle acceleration, deceleration, and steering based on the driver's visual observation of the surroundings of the vehicle. The vehicle may include one or more displays that display various information to the driver. For example, some vehicles include an infotainment system that includes a display that displays various infotainment and other vehicle information. The vehicle may also include a HUD that displays information by forming a virtual image at a certain distance forward of a windshield and with reflection of the windshield. For example, the HUD may display a vehicle speed and other vehicle information (e.g., warnings such as lane departure warnings and collision avoidance warnings).

SUMMARY

An assistance system is disclosed and includes: an augmented reality module configured to i) determine a path of a host vehicle, ii) detect one or more objects with one or more trajectories predicted to interfere with the path of the host vehicle, and iii) based on the one or more trajectories, generate a first digital gateway indicative that the host vehicle should yield for the one or more objects; a display control module configured to control an augmented reality head-up display to display the first digital gateway in a closed state over an environment forward of the host vehicle and along the path of the host vehicle; and a vehicle control module configured to yield to the one or more objects as the host vehicle approaches the first digital gateway.

In other features, the augmented reality module is configured to i) collect data regarding the one or more objects from one or more exterior sensors and via at least one of V2X communication, communication with a cloud-based network device, communication with a back office, communication with a mobile device, and ii) detect the one or more objects based on the collected data.

In other features, the augmented reality module is configured to i) collect data from one or more interior sensors, and ii) track location and gaze direction of eyes of a vehicle occupant based on the data. The display control module is configured to display the first digital gateway based on the location and gaze direction of the eyes of the vehicle occupant.

In other features, the augmented reality module is configured to detect when the path of the host vehicle is clear, and change the first digital gateway from a closed state to an open state indicating that at least one of the host vehicle is permitted to continue along the path and it is safe for the host vehicle to proceed along the path.

In other features, the augmented reality module is configured when changing state of the first digital gateway to change at least one of color, shape, image, orientation, pulsing state, and size of the first digital gateway.

In other features, the augmented reality module is configured to generate the first digital gateway to include multiple geometrical shapes that move relative to each other when the first digital gateway is in a closed state and do not move relative to each other when the first digital gateway is in an open state.

In other features, the augmented reality module is configured to generate one or more images to highlight the one or more objects. The display control module is configured to display the one or more images via the augmented reality head-up display.

In other features, the first digital gateway is in a shape of at least one of an accelerator pedal and a brake pedal.

In other features, the first digital gateway is in an image of representative of the path. The image has at least one of different colored sections, different shaded sections, and different patterned sections to indicate where along the path it is safe to move forward and where along the path it is unsafe to move forward and thus the host vehicle should yield to the one or more objects.

In other features, the augmented reality device is configured to determine another possible path for the host vehicle, and generate second digital gateway associated with the another possible path. The display control module is configured to display the second digital gateway while displaying the first digital gateway.

In other features, the augmented reality module is configured to receive an override signal, and based on the override signal, i) cease displaying the first digital gateway, or ii) select or change a state of the first digital gateway.

In other features, an assistance method is disclosed and includes: determining a path of a host vehicle; detecting one or more objects with one or more trajectories predicted to interfere with the path of the host vehicle; based on the one or more trajectories, generating a first digital gateway indicative that the host vehicle should yield for the one or more objects; controlling an augmented reality head-up display to display the first digital gateway in a closed state over an environment forward of the host vehicle and along the path of the host vehicle; and yielding to the one or more objects as the host vehicle approaches the first digital gateway.

In other features, the assistance method further includes: collecting data regarding the one or more objects from one or more exterior sensors and via at least one of V2X communication, communication with a cloud-based network device, communication with a back office, communication with a mobile device; detecting the one or more objects based on the collected data.

In other features, the assistance method further includes: collecting data from one or more interior sensors, and ii) track location and gaze direction of eyes of a vehicle occupant based on the data; and displaying the first digital gateway based on the location and gaze direction of the eyes of the vehicle occupant.

In other features, the assistance method further includes detecting when the path of the host vehicle is clear, and changing the first digital gateway from a closed state to an open state indicating that at least one of the host vehicle is permitted to continue along the path and it is safe for the host vehicle to proceed along the path.

In other features, changing state of the first digital gateway includes changing at least one of color, shape, image, orientation, pulsing state, and size of the first digital gateway.

In other features, the assistance method further includes generating the first digital gateway to include multiple geometrical shapes that move relative to each other when the first digital gateway is in a closed state and do not move relative to each other when the first digital gateway is in an open state.

In other features, the assistance method further includes: generating one or more images to highlight the one or more objects; and displaying the one or more images via the augmented reality head-up display.

In other features, the first digital gateway is in a shape of at least one of an accelerator pedal and a brake pedal.

In other features, the first digital gateway is in an image of representative of the path. The image has at least one of different colored sections, different shaded sections, and different patterned sections to indicate where along the path it is safe to move forward and where along the path it is unsafe to move forward and thus the host vehicle should yield to the one or more objects.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

Figure 1:
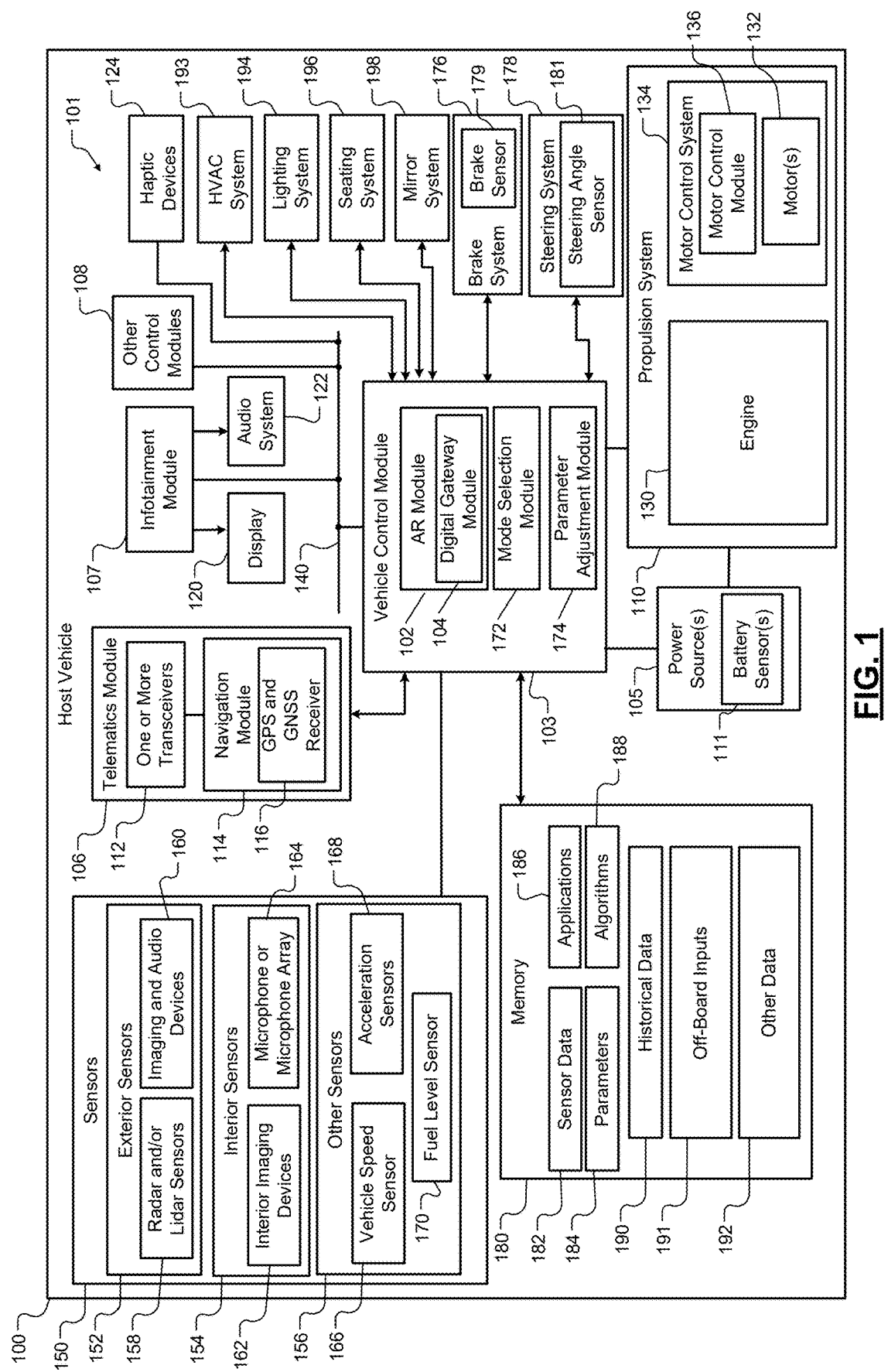
FIG. 1 is a functional block diagram of a host vehicle including an example advanced driver assist system (ADAS) with an AR module providing digital gateways in accordance with the present disclosure.

A host vehicle may be a partially or fully autonomous vehicle and operate in an autonomous mode to drive the host vehicle to a destination. While operating in the autonomous mode, the host vehicle controls vehicle driving operations such as steering, accelerating, and braking operations. During the autonomous mode, a driver of the vehicle may override autonomous control and thus return driving control of the vehicle back to the driver. The driver may override autonomous control when, for example, the driver sees an object (e.g., a pedestrian, a cyclist, other vehicle, etc.) and believes that the host vehicle is not going to slow down and/or stop in time to avoid a collision. For example, a host vehicle may follow a predetermined path, which may include making an upcoming left turn. There may be an object along the left turn path of the vehicle. If the vehicle does not slow down and/or stop when the driver deems appropriate, the driver may take over driving the host vehicle.

The naked eye and non-augmented mind are challenged to identify the order of yielding operations. In a self-driving scenario, driver and passenger situational uncertainty and mistrust of autonomous systems are exacerbated. Machine learning and vehicle cameras may be used to identify and visually communicate whether an autonomous vehicle plans to yield to right-of-way obstacles. However, presenting this information on a digital cluster would require a driver to remove their eyes and focus away from the road ahead, promoting unsafe driving practices.

The examples set forth herein include an ADAS including an ARHUD that displays a digital gateway indicative whether a path is clear and whether a host vehicle plans to yield to one or more objects along the path. The digital gateway is displayed to a driver via a windshield of the host vehicle. Other virtual images and information may also be displayed as further described below. The digital gateway provides a driver with information regarding planned actions of the vehicle. This can aid in building confidence of the driver in the autonomous driving system of the host vehicle and reduce the number of times the driver overrides an autonomous driving mode of the host vehicle. Digital gateways and/or the other information may be provided when the host vehicle is operating in partially and fully autonomous modes. The digital gateways and/or other information may also be provided when operating in a manual (or non-autonomous) mode for driving assistance purposes.

In an embodiment, the ADAS uses computer vision, machine learning and cloud computing to identify, communicate, and evaluate scenarios where a moving host vehicle should yield to pedestrian(s), an obstructed roadway, and/or oncoming (right-of-way) traffic. When vehicle sensors detect a pedestrian, oncoming right-of-way traffic, and/or roadway obstruction, the ARHUD system displays a graphic indicator for each obstacle. In the instance that the host vehicle should yield to right-of-way obstacle(s), a digital gateway (e.g., a couple red rectangles) are displayed in the line of sight of a driver and/or a passenger. The digital gateway is closed at this stage and thus is displayed in a manner to indicate to the driver and/or passenger that the host vehicle is to yield to the detected obstacle(s). Once the right-of-way obstacle(s) have cleared the pathway of the host vehicle, the digital gateway changes to indicate that the pathway is clear and the host vehicle can proceed. As an example, the digital gateway may change from a pair of pulsing red rectangles to non-pulsing dashed green rectangles. Other examples are described herein. This new state indicates that the digital gateway is now open and the host vehicle will proceed along its originally intended pathway. The ADAS visualizes and takes into consideration in real-time pedestrians, roadway obstructions and oncoming traffic and performs operations to provide enhanced situation awareness to vehicle occupants. The ADAS provides situation awareness in automated driving modes to increase user trust and aid in vehicle take-over.

The ARHUD of the ADAS displays conformal graphics overlaid on a viewer's view of a roadway to highlight the presence and real-time location of pedestrians, roadway obstructions, right-of-way traffic, and other objects. In an embodiment, the ADAS automatically activates in scenarios where the host vehicle should yield to right-of-way obstacles. The AR graphics include conformal graphics showing i) a closed digital gateway to communicate to vehicle occupants that the vehicle is planning to yield for one or more identified objects, and ii) an open digital gateway when the pathway of the host vehicle is unobstructed and the host vehicle is cleared to proceed.

In an embodiment, a vehicle occupant (e.g., driver or passenger) may manually override the yielding operation being performed and/or the non-yielding operation being performed by, for example, gently tapping on the brake or the accelerator to partially or fully disengage the ADAS. In an embodiment, a driver and/or passenger manually overrides yielding associated with a closed digital gateway by gently tapping on an accelerator to disengage the ADAS. The ADAS is configured to perceive the road ahead based on outputs of sensors (e.g., cameras, radar sensors, and/or lidar sensors) and vehicle-to-everything (V2X) communication including vehicle-to-vehicle communication, vehicle-to-mobile device communication, vehicle-to-infrastructure communication, and other communication (e.g., vehicle to distributed network communication).

Figure 2:
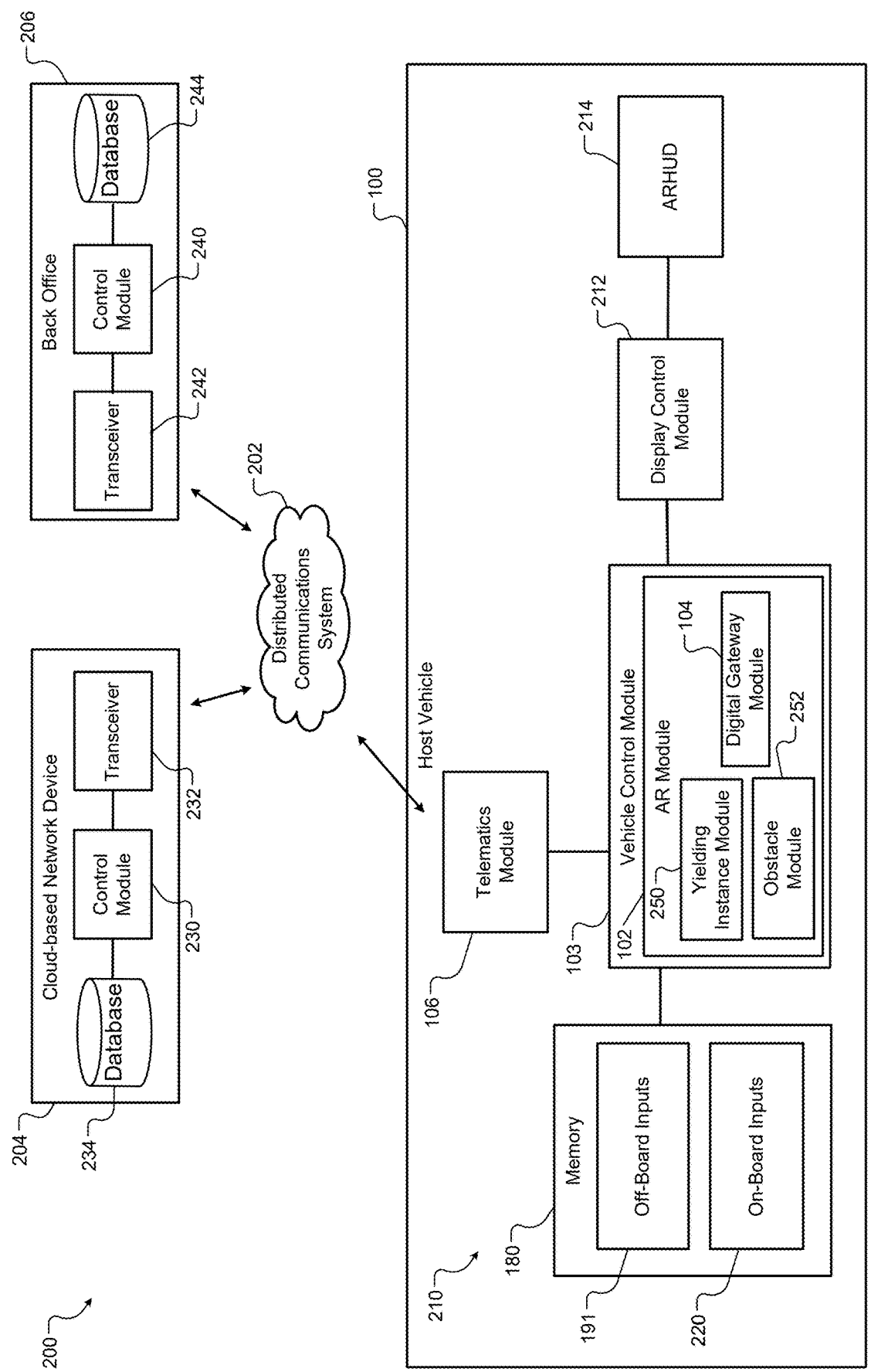
FIG. 2 is a functional block diagram of a communication system including the host vehicle in accordance with the present disclosure.

FIG. 1 shows a host vehicle 100 including an ADAS 101 with an AR module 102 providing digital gateways and other virtual images and information, as further described below. A portion of the ADAS 101 is shown in FIG. 1 and additional details of the ADAS are shown in FIG. 2. The host vehicle 100 includes a vehicle control module 103, which as shown includes the AR module 102. The AR module 102 performs: perception (or situation) determining operations; object detection, identification, classification, and graphical and visual identification operations; data look-up, collection, and gathering operations; interaction timing operations; AR operations; digital gateway operations; image overlay operations; dialog operations including providing speech, text, and/or haptic messages; etc. The vehicle control module 103 may perform various operations based on the interaction with the user and the messages, generated as further described below.

The AR module 102 may include a digital gateway module 104 for generating and changing digital gateways. As used herein the term digital gateway refers to a virtual image displayed and overlaid over an environment to indicate to a vehicle occupant whether the vehicle is planning to yield and/or is yielding to one or more objects. The term "yield" refers to the host vehicle reducing speed, stopping, and/or remaining in a non-moving state. This is done to avoid a collision with the one or more objects. The digital gateway may: be in the form of a one or more rectangles (or other shaped objects); include an image of an accelerator pedal or a brake pedal, which may be in different orientations to indicate whether the vehicle is planning to yield or not; be in the shape of an accelerator pedal or a brake pedal; change in shape; change in size; change in color; etc. In one embodiment, the digital gateway is a pair of solid red rectangles when the vehicle is about to yield and/or is yielding and is a pair of dashed green rectangles when no longer needing to yield and/or when no longer yielding. In another embodiment, the digital gateway is in the shape of a brake pedal when about to yield and when yielding and is in the shape of an accelerator pedal when no longer needing to yield and/or when no longer yielding. In another embodiment, the digital gateway includes an accelerator pedal in an upright position when about to yield and yielding and includes the accelerator pedal at a rotated angle when no longer needing to yield and/or when no longer yielding. In another embodiment, the digital gateway is pulsing/flashing and/or presented in bold when about to yield and when yielding and is no longer pulsing/flashing and/or presented in bold when no longer needing to yield and/or when no longer yielding. Some examples of digital gateways are shown in FIGS. 3-9.

The host vehicle 100 further includes one or more power sources 105, a telematics module 106, an infotainment module 107, other control modules 108 and a propulsion system 110. The vehicle control module 103 may control operation of the vehicle 100 including the propulsion system 110. The power sources 105 may include one or more battery packs, a generator, a converter, a control circuit, terminals for high and low voltage loads, etc., as well as one or more battery sensors 111 for detecting states of the power sources 105 including voltages, current levels, states of charge, etc.

The telematics module 106 provides wireless communication services within the host vehicle 100 and wirelessly communicates with service providers, network devices, other vehicles, mobile devices, infrastructure devices, and other devices external and/or internal to the host vehicle 100. The telematics module 106 may support Wi-Fi®, Bluetooth®, Bluetooth Low Energy (BLE), near-field communication (NFC), cellular, legacy (LG) transmission control protocol (TCP), long-term evolution (LTE), and/or other wireless communication and/or operate according to Wi-Fi®, Bluetooth®, BLE, NFC, cellular, and/or other wireless communication protocols. The telematics module 106 may include one or more transceivers 112 and a navigation module 114 with a global positioning system (GPS) and GNSS (or Global Navigation Satellite System) receiver 116. The transceivers 112 wirelessly communicate with network devices internal and external to the host vehicle 100 including cloud-based network devices, central stations, back offices, and portable network devices. The transceivers 112 may perform pattern recognition, channel addressing, channel access control, and filtering operations.

The navigation module 114 executes a navigation application to provide navigation services. The navigation services may include location identification services to identify where the host vehicle 100 is located. The navigation services may also include guiding a driver and/or directing the host vehicle 100 to a selected location. The navigation module 114 may communicate with a central station to collect map information indicating levels of traffic, transportation object identification and locations (e.g., locations and types of signs), path information, where rest areas are located, where gas stations are located, where restaurants are located, etc. As an example, if the host vehicle 100 is an autonomous vehicle, the navigation module 114 may direct the vehicle control module 103 along a selected route to a selected destination. The GPS and GNSS receiver 116 may provide vehicle velocity and/or direction (or heading) of the host vehicle 100 and other vehicles and objects (e.g., pedestrians and cyclists) and/or global clock timing information.

The infotainment module 107 may include and/or be connected to an audio system 122 and/or a video system including one or more displays (one display 120 is shown). The display 120 and audio system 122 may be part of a human machine interface. The displays may include cluster and/or center console displays, head-up displays, etc. Haptic devices 124 (e.g., steering wheel and/or seat vibration devices) may be used in addition to the displays and the audio system 122 to interact with a vehicle occupant such as a driver or passenger. This interaction is further described below. Messages may be displayed, audibly played out, and/or indicated via the display 120, the audio system 122, the haptic devices 124, and/or via one or more other output devices.

The infotainment module 107 may provide various informative, warning, and proactive messages including information regarding: upcoming and currently being performed operations (e.g., braking, accelerating, turning operations), detected objects (or obstacles); upcoming and/or nearby gas stations, upcoming and/or nearby restaurants, music services, upcoming and/or nearby shops, vehicle status information, diagnostic information, prognostic information, entertainment features, etc. The infotainment module 107 may be used to guide a vehicle operator to a certain location, indicate trip estimations (e.g., distances to selected destinations), and other information.

The propulsion system 110 may include one or more torque sources, such as one or more motors and/or one or more engines (e.g., internal combustion engines). In the example shown in FIG. 1, the host vehicle 100 includes an engine 130 and one or more motors 132. The torque sources are independently controlled. The propulsion system 110 includes a motor control system 134 that includes the one or more motors 132 and a motor control module 136 that may control operation of the one or more motors 132 based on signals from the vehicle control module 103.

The modules 103, 104, 107, 108 may communicate with each other via one or more buses 140, such as a controller area network (CAN) bus and/or other suitable interface. The vehicle control module 103 may control operation of vehicle modules, devices and systems based on feedback from sensors 150.

The sensors 150 may include exterior sensors 152, interior sensors 154, and other sensors 156. The exterior sensors 152 may include radar and/or lidar sensors 158 and imaging and audio devices (e.g., visual spectrum cameras, long-wave infrared cameras, short-wave infrared cameras, ambient light sensors, and microphone or microphone array) 160. The exterior sensors 152 may be used to detect objects external to the host vehicle 100 and/or in a path of the host vehicle 100.

The interior sensors 154 may include interior imaging sensors (e.g., cameras) 162 and a microphone or microphone array 164. The interior sensors 154 may be used to monitor a vehicle occupant to detect and track head locations and/or eyes. Location and movement of vehicle occupant head and eyes may be tracked. As an example, the interior sensors 154 may track eyes of a driver and eye gaze direction, detect gestures made by the driver, detect orientation of a body of the driver, detect speech of the driver, etc. This monitoring is useful in determining whether the driver is looking for a gas station, a restaurant, a rest area, or other shop and/or location. This monitoring may be used to determine whether the driver is looking at a particular sign or types of signs along a path of the host vehicle 100. The interior sensors 154 may be used to detect, for example, when the driver is looking at signs indicating upcoming gas stations. This is indicative that the driver wants to stop to get gas. This type of monitoring is also applicable for other types of businesses, rest areas, and/or locations.

The other sensors 156 may include a vehicle speed sensor 166, acceleration sensors (e.g., longitudinal and lateral acceleration sensors) 168, and a fuel level sensor 170, as shown, and other sensors such as an inclinometer, an engine temperature sensor and an engine oil pressure sensor. Additional sensors may also be included such as brake system sensors (a brake sensor 179 is shown) and steering system sensors (a steering angle sensor 181 is shown).

The AR module 102 may use machine learning for object classification including to identify and/or classify pedestrians, cyclists, and vehicles (e.g., oncoming traffic), as well as for probable trajectory determination of each detected, identified and/or classified object. The AR module 102 may determine the locations of objects based on feedback from the sensors 150. The AR module 102 may also detect driver (or occupant) head and eye position and gaze angle, which may be used to calculate and continually adjust the location of projected conformal graphics overlaid on the roadway in real-time. The graphics include digital gateways, object identifiers, and other displayed information.

The vehicle control module 103 may also include a mode selection module 172 and a parameter adjustment module 174. The mode selection module 172 may select a vehicle operating mode. The parameter adjustment module 174 may be used to adjust parameters of the host vehicle 100. The vehicle control module 103 may perform autonomous operations based on interaction with a vehicle occupant. As an example, the vehicle control module 103 may operate in a fully or partially autonomous mode and may control the propulsion system 110, a brake system 176, and a steering system 178. In an embodiment, the vehicle control module 103 controls operation of the systems 110, 176 and 178 based on interactions with a vehicle occupant. The vehicle control module 103 may i) perform autonomous operations such as steering, braking, accelerating, etc., and/or ii) display and/or audibly playout messages, perform haptic operations via haptic devices 124, and/or output messages and/or corresponding signals via other output devices.

The host vehicle 100 may further include the memory 180. The memory 180 may store sensor data 182, parameters 184, applications 186, algorithms 188, historical data 190, off-board inputs 191 from other devices external to the host vehicle 100 and other data 192. The parameters may include sensor parameters such as vehicle speed, vehicle acceleration, battery state of charge, fuel level, etc. applications 186 (e.g., a trip energy estimation application). The applications 186 may include applications executed by the modules 103, 104, 107, 108.

Although the memory 180 and the vehicle control module 103 are shown as separate devices, the memory 180 and the vehicle control module 103 may be implemented as a single device. The memory 180 may also store historical data 190 and other data 192 such as driver driving patterns, driver fueling patterns, driver stopping patterns, driver pickup patterns, other driver patterns, data collected by and/or generated by at least one of the modules 102, 103, traffic data, navigation data, map data, GPS data, path data, speed data, and acceleration data, etc.

The vehicle control module 103 may control operation of the propulsion system 110, the video system including the display 120, the audio system 122, the haptic devices 124, the brake system 176, the steering system 178, a heating ventilation and air-conditioning (HVAC) system 193, a lighting system 194, a seating system 196, a mirror system 198, and/or other devices and systems according to parameters set by the modules 103, 107, 108, 174. The vehicle control module 103 may set at least some of the parameters based on signals received from the sensors 150.

The vehicle control module 103 may receive power from the power sources 105, which may be provided to the propulsion system 110, the brake system 176, the steering system 178, a HVAC system 193, the lighting system 194, the seating system 196, the mirror system 198, etc. Power supplied to the haptic devices 124, the motors 132, the brake system 176, the steering system 178, a HVAC system 193, the lighting system 194, the seating system 196, the mirror system 198, and/or actuators thereof may be controlled by the vehicle control module 103 to, for example, adjust: motor speed, torque, and/or acceleration; braking pressure; steering wheel angle; pedal position; state of haptic devices 124; etc. This control may be based on the outputs of the sensors 150, the navigation module 114, the GPS and GNSS receiver 116, the data and information received from external devices, and the data and information stored in the memory 180.

The vehicle control module 103 may determine various parameters including a vehicle speed, a motor speed, a gear state, an accelerator position, a brake pedal position, an amount of regenerative (charge) power, an amount of auto start/stop discharge power, and/or other information. The power sources 105 and/or a control circuit thereof may determine other parameters, such as: an amount of charge power at each source terminal; an amount of discharge power at each source terminal; maximum and minimum voltages at source terminals; maximum and minimum voltages at power rails, cells, blocks, packs, and/or groups; SOX values of cells, blocks, packs, and/or groups; temperatures of cells, blocks, packs, and/or groups; current values of cells, blocks, packs, and/or groups; power values cells, blocks, packs, and/or groups; etc.

The acronym "SOX" refers to a state of charge (SOC), a state of health (SOH), state of power (SOP), and/or a state of function (SOF). Power, voltage and/or current sensors may be included separate from and/or in the power sources 105 for SOX determinations. The SOC of a cell, pack and/or group may refer to the voltage, current and/or amount of available power stored in the cell, pack and/or group. The SOH of a cell, pack and/or group may refer to: the age (or operating hours); whether there is a short circuit; whether there is a loose wire or bad connection; temperatures, voltages, power levels, and/or current levels supplied to or sourced from the cell, pack and/or group during certain operating conditions; and/or other parameters describing the health of the cell, pack and/or group. The SOF of a cell, pack and/or group may refer to a current temperature, voltage, and/or current level supplied to or sourced from the cell, pack and/or group, and/or other parameters describing a current functional state of the cell, pack and/or group. The power sources 105 may determine connected configurations of the cells and corresponding switch states as described herein based on the parameters determined by the vehicle control module 103 and/or the control circuit (or module) of the power sources 105. The vehicle control module 103 may control operations of the systems 110, 176, 178 based on the stated parameters. The AR module 102 may display vehicle status information based on the stated parameters.

The AR module 102 monitors real-time behavior of vehicle occupants including speech, gaze patterns, head positions, gestures (e.g., hand gestures, finger gestures, facial gestures, etc.). Gaze patterns include directions of an occupant's head and eyes. This information is used to determine where to display information. The stated information may also be used to determine whether an occupant is concerned about one or more objects seen by the occupant. For example, if a driver sees a pedestrian, cyclist or vehicle in a pathway of the host vehicle 100, the driver may be concerned whether the host vehicle 100 is going to yield in time to avoid a collision. In response to detecting the driver monitoring an object for a set period of time, the AR module 102 may display a digital gateway and/or other information to indicate to the driver that the object is detected and the planned operations of the host vehicle 100. The AR module 102 may display this information regardless of whether the driver is monitoring the stated object.

The host vehicle 100 can include various systems for assisting a driver, for performing autonomous operations, and/or for indicating to a vehicle occupant information regarding an environment of the host vehicle. For example, a host system may include a navigation system that provides map information indicating lane boundaries, street locations, speed limits, geographical locations of selected destinations, etc. The host system may provide the driver with instructions for driving to a selected destination and/or may perform autonomous operations such as braking, steering and accelerating operations to drive the vehicle to the destination based on the map information.

As another example, the host vehicle 100 may include object detection and collision warning systems for detecting impending objects and performing countermeasures and/or taking evasive action to prevent a collision. The vehicle control module 103 determines locations of the objects relative to the host vehicle 100 and trajectories of the objects and the host vehicle 100. If it is determined that the host vehicle 100 is likely to collide with one of the objects, one or more warning signals may be generated to indicate to the driver and/or the object of concern of the potential collision. These warnings may be provided in addition to digital gateways and other information described herein. The vehicle control module 103 may also or alternatively perform one or more other countermeasures (e.g., apply brakes to decelerate the host vehicle, change a steering angle of the host vehicle, etc.) to prevent a collision.

FIG. 2 shows communication system 200 that includes the host vehicle 100, a distributed communications system 202, a cloud-based network device 204, and a back office 206. A portion 210 of the ADAS 101 of FIG. 1 is shown. The portion 210 includes the vehicle control module 103, the telematics module 106, the memory 180, a display control module 212 (also referred to as a ARHUD image engine), and a ARHUD 214. The vehicle control module 103 includes the AR module 102, which may include the digital gateway module 104, a yielding instance module 250 and an obstacle module 252. The display control module 212 may be implemented as part of the infotainment module 107 of FIG. 1.

The memory 180 includes the off-board inputs 191 and on-board inputs 220. The off-board inputs 191 may include: GPS information; information received via the Internet; and/or information received via V2X communication, WiFi communication, cellular communication, and/or satellite communication. The off-board inputs 191 may include information received from the cloud-based network device 204 and/or the back office 206. The on-board inputs 220 may include eye position and gaze angle of a vehicle occupant, automated driving system status information, vehicle braking information, steering angle information, object detection information, vehicle acceleration information, etc. This information may be provided via the sensors referred to herein.

The cloud-based network device 204 may include a control module 230, a transceiver 232, and a database 234. One or more cloud-based network device may be included and include one or more edge devices. The back office 206 may include a control module 240, a transceiver 242, and a database 244.

The yielding instance module 250 may execute an algorithm to identify instances where the host vehicle 100 should yield. The obstacle module 252 may execute an algorithm to identify object trajectories that collide with (or cross) a planned (or intended) path of the host vehicle 100.

The AR module 102 may utilize computer vision, machine learning, V2X communication, and cloud computing to highlight objects within a scenario which the host vehicle 100 should yield to including pedestrian(s), obstructing roadway objects, oncoming (right-of-way) traffic, and/or other objects. Machine learning algorithms may be used to classify types and trajectories of objects located within range of the planned pathway of host vehicle 100. The AR module 102 may provide a graphical user-interface to convey presence and intention (i.e., predicted paths) of detected objects. The AR module 102 may track locations of the host vehicle 100 and other objects, speed of host vehicle 100 and other objects, trajectories of the host vehicle 100 and other objects, roadway curvatures, vehicle steering, etc. and display images via the ARHUD 214 based on these locations, speeds, trajectories, and roadway curvatures. The AR module 102 may also display the images having selected type, size, shape and color based on the stated information and occupant position, host vehicle location, and other vehicle sensed aspects of the driving environment.

The AR system 102 utilizes a windshield as a display and provides an augmented reality via the ARHUD 214. The ARHUD 214 has a wide field-of-view and may operate in different modes including a dual plane augmented reality HUD mode, where the ARHUD 214 has a second image plane that can represent images appearing further on the roadway surface (e.g., 25-100 meters in front of the host vehicle) and covering as much as multiple lanes of traffic. In an embodiment, the windshield has a polyvinyl butyral (PVB) layer with embedded transparent phosphors. In this embodiment, the ARHUD 214 includes a pico projector with ultraviolet (UV) lasers that span the windshield area and excite fluorescence from the phosphors. The ARHUD 214 may make use of red green blue (RGB) phosphor film embedded in vehicle glass and stimulate the film with ultraviolet lasers to create photons of light on the corresponding vehicle glass.

The windshield may have randomly embedded transparent RGB phosphors and be formed at least partially of polyvinyl butyral. The phosphors may be addressed with ultraviolet light via ultraviolet lasers that are specific to red, green, blue phosphors. Laser induced fluorescence occurs for each irradiated spot (no eye box). Lasers may be included in a pico projector that has a wide throw angle and is mounted to, for example, a headliner of the host vehicle 100. Photons are born at the phosphor location and the image distance is at the windshield plane.

In another embodiment, the windshield includes a transparent optic film layer and the ARHUD 214 includes visible light projectors. The ARHUD 214 displays conformal graphics, which include digital gateways such as any of the digital gateways disclosed herein. A first (or closed) digital gateway is displayed to communicate the host vehicle's intent to yield for right-of-way obstacles. A second (or open) digital gateway that is different than the first digital gateway is displayed to communicate that the host vehicle's pathway is unobstructed and the vehicle is cleared to proceed. The displaying locations of the digital gateways is based on data received from cameras, which are used to track eyes of vehicle occupants to continuously determine locations on a glass window (e.g., the windshield) where to overlay ARHUD graphics. The ARHUD may display identification, augmentation, and classification of objects and roadway obstructions and/or output this information to other vehicles and network devices.

The AR module 102 may: implement a registration including determining locations of images based on vehicle and user information; execute applications including a priority application; execute algorithms for distortion and perspective compensation accounting for windshield curvature; execute algorithms for intensity of AR images relative to ambient environment; coordinate head and eye positioning to a host vehicle reference frame; predict future head and eye positioning; predict future host vehicle speed, specific force, angular rate, and orientation (e.g., via an inertial measurement unit (IMU)), acceleration, and terrain; and tie generated virtual conformal images to a road. The vehicle reference frame (or vehicle coordinate system) may be tied to a world reference frame (or world coordinate system).

Figure 3:
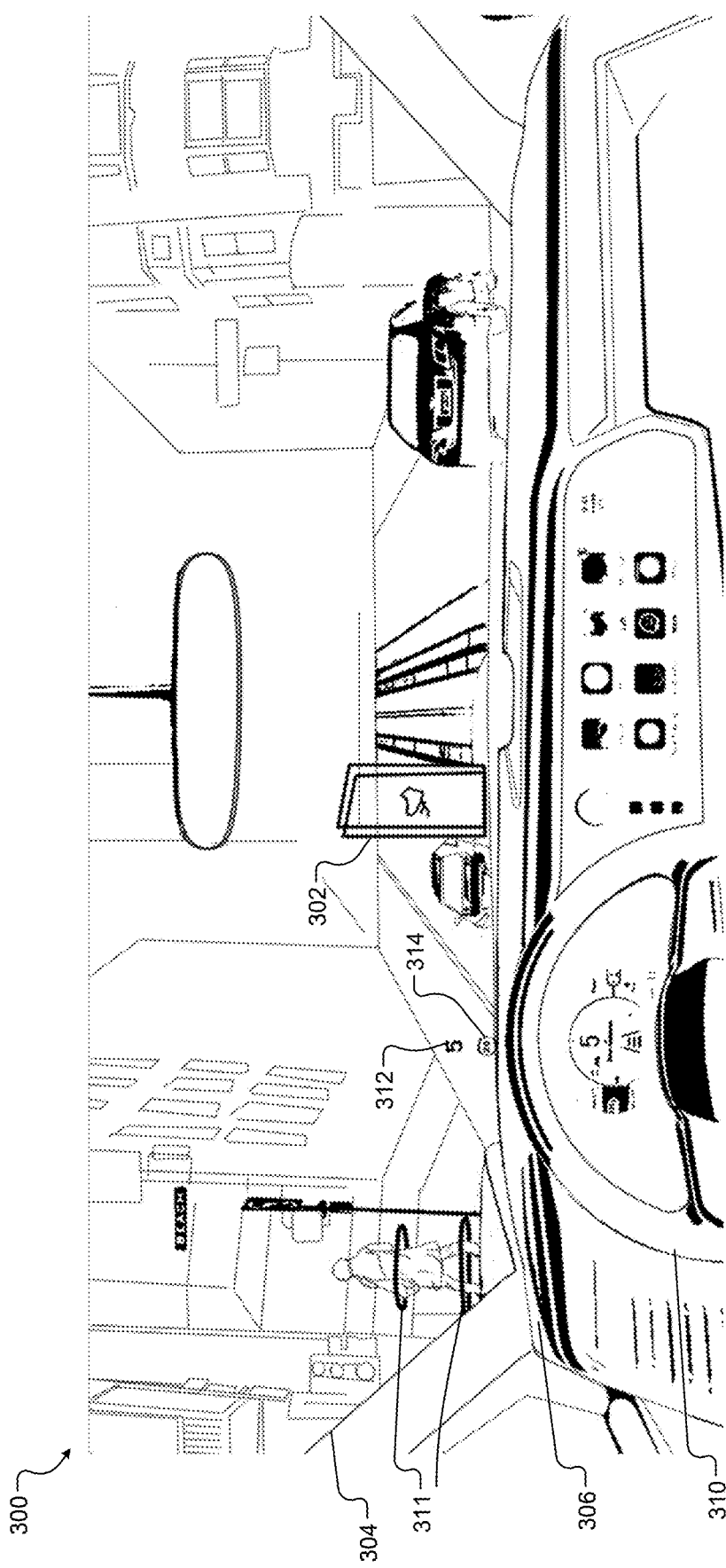
FIG. 3 is a perspective view of an example interior of a vehicle including a augmented reality head-up display (ARHUD) displaying an example closed digital gateway and other information in accordance with the present disclosure.

FIG. 3 shows an interior 300 of a vehicle (e.g., the host vehicle 100 of FIGS. 1-2) including a ARHUD (e.g., the ARHUD 214 of FIG. 2) displaying an example closed digital gateway 302 and other information (e.g., host vehicle speed, speed limit, object highlighting, etc.). The vehicle includes a windshield 304 located in a front opening of the vehicle. Passengers within a passenger cabin of the vehicle can look through the windshield 304 to see in front of the vehicle. The windshield 304 is visually located above a dashboard 306 of the vehicle. The vehicle may include a steering wheel 310. The vehicle may be an autonomous vehicle, a semi-autonomous vehicle, or a non-autonomous vehicle.

An ARHUD, such as that described above with respect to FIGS. 1-2, projects images onto portions of the windshield 304. The images include: the digital gateway 302; object highlighting features 311; various vehicle related information, such as a present speed of the vehicle 312 and the speed limit 314; and other information. The object highlighting features 311 may include rings as shown and/or other object highlighting features. The highlighting features may surround, partially or fully cover, and/or point to and/or away from the objects. The highlighting features may flash, move, change in size and/or shape, and/or have another changing feature. The objects that are highlighted may only be objects that are in or will be in the pathway of the host vehicle.

The other information may include, for example, a present gear of a transmission of the host vehicle, an engine speed, a directional heading of the vehicle, present infotainment system settings, and/or other vehicle information. Some further examples are shown in FIG. 4-9. The image presents data to the vehicle occupant of the vehicle without the vehicle occupants having to look away from objects in front of the vehicle.

Figure 4:
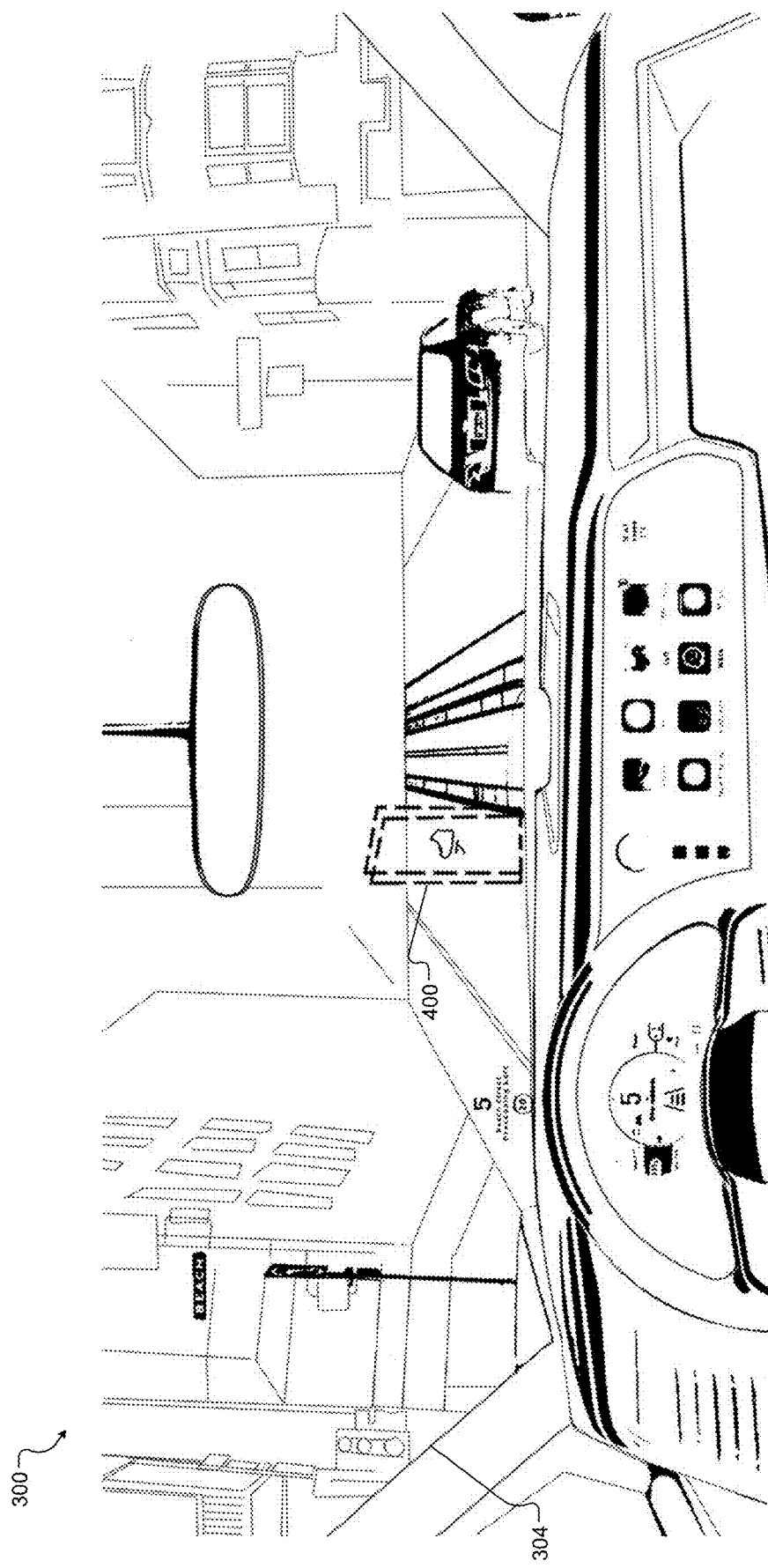
FIG. 4 is a perspective view of the example interior of FIG. 3 where the ARHUD is displaying an example open digital gateway and other information in accordance with the present disclosure.

FIG. 4 shows the interior 300 and the ARHUD is displaying an example open digital gateway 400 and other information. The other information may identify an upcoming street and the turning direction of the host vehicle. In the example shown, the AR system of the host vehicle is displaying the street name and indicating that the host vehicle is proceeding to turn left at the identified street. In the example shown, this information is provided as text vertically between the speed of the vehicle the speed limit indications. In this example, the path of the host vehicle is clear allowing the host vehicle to make the left turn.

Figure 5:
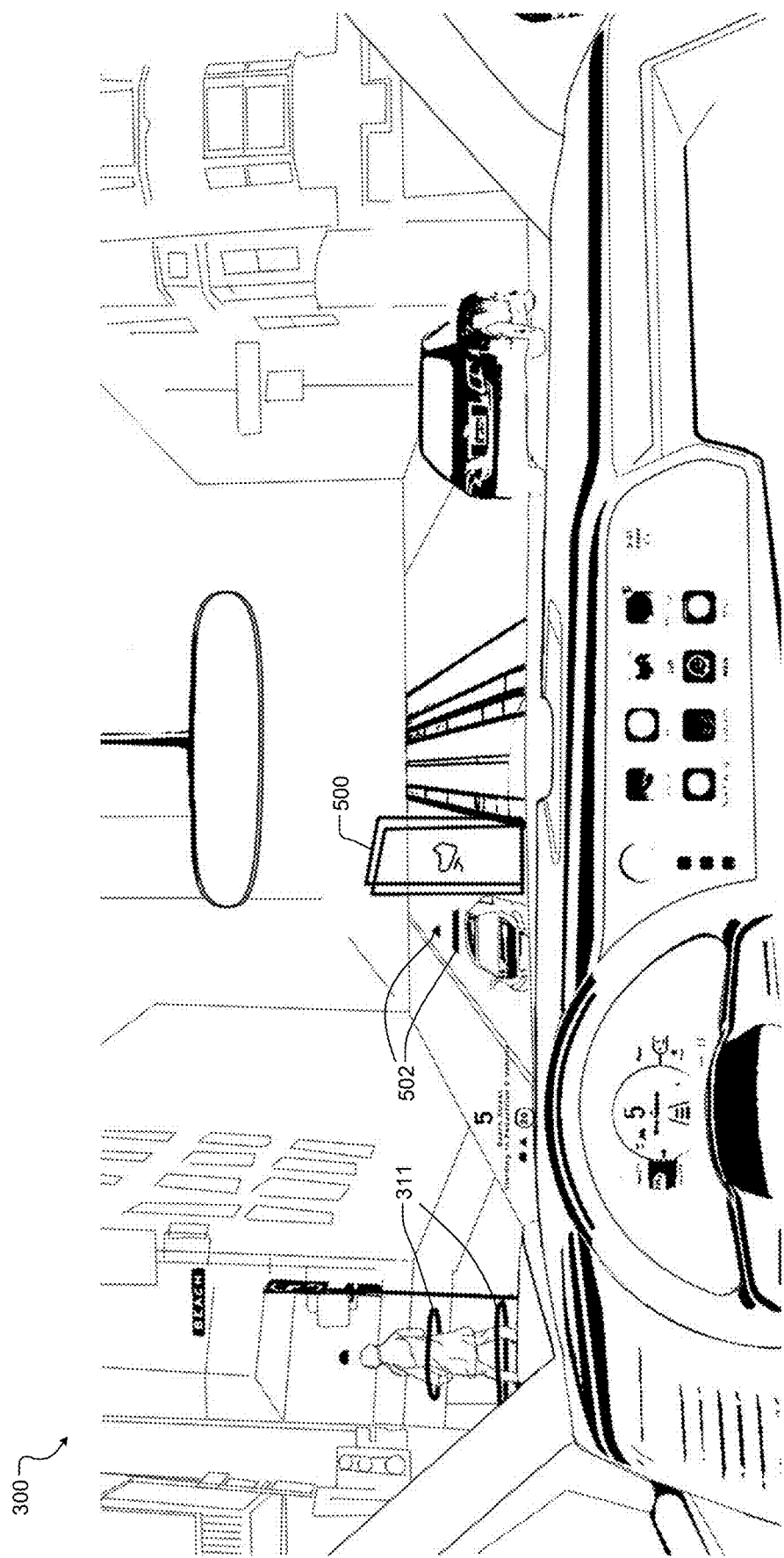
FIG. 5 is a perspective view of the example interior of FIG. 3 where the ARHUD is displaying an example closed digital gateway, object highlighting features, and other information in accordance with the present disclosure.

FIG. 5 shows the interior 300 and the ARHUD is displaying an example closed digital gateway 500, the object highlighting features 311, 502, and other information. The object highlighting features 311, 502 may include rings surrounding an object and/or segmented lines, as shown, and/or other highlighting features.

Figure 6:
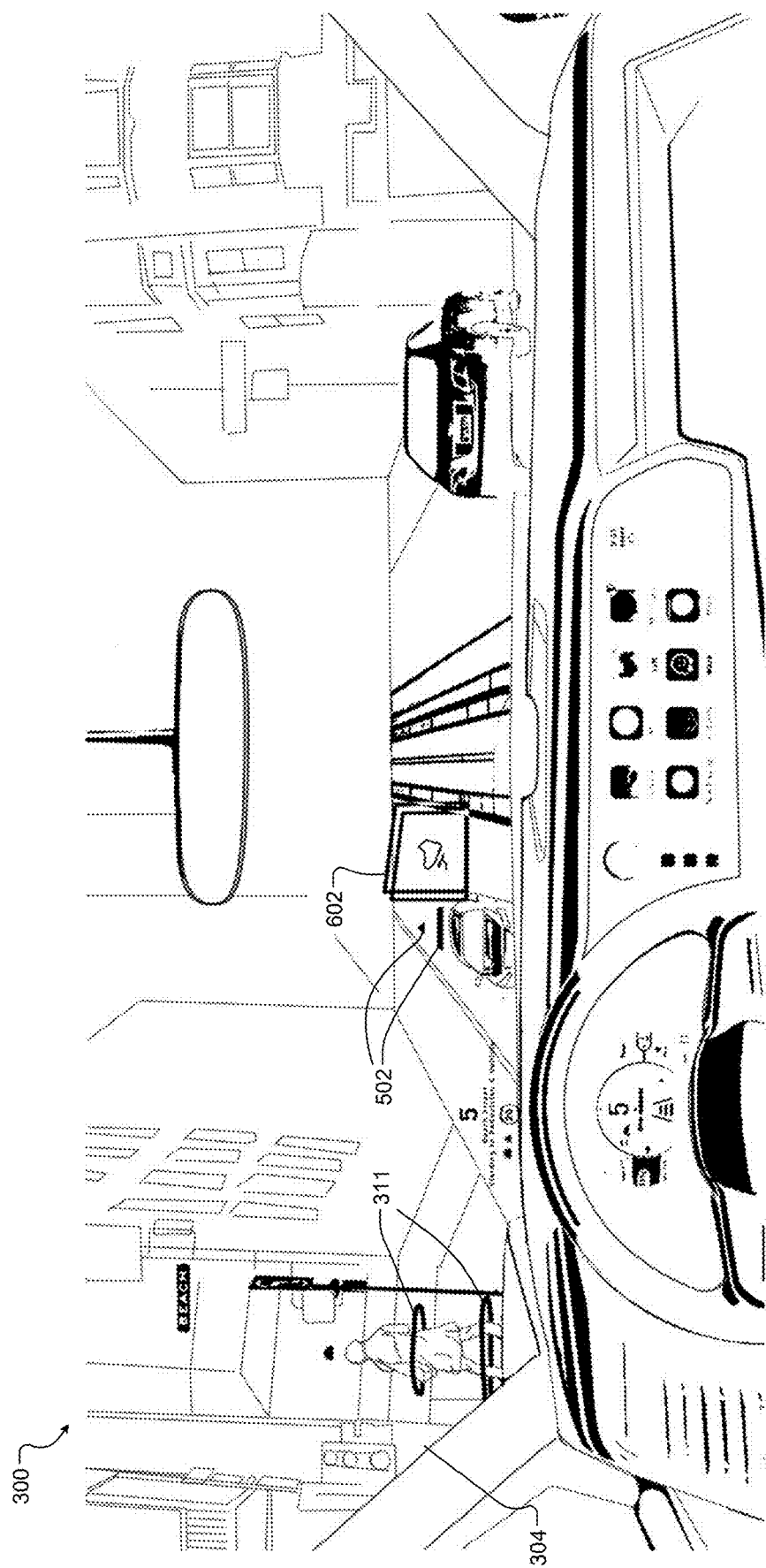
FIG. 6 is a perspective view of the example interior of FIG. 3 where the ARHUD is displaying another example closed digital gateway, object highlighting features, and other information in accordance with the present disclosure.
Figure 7:
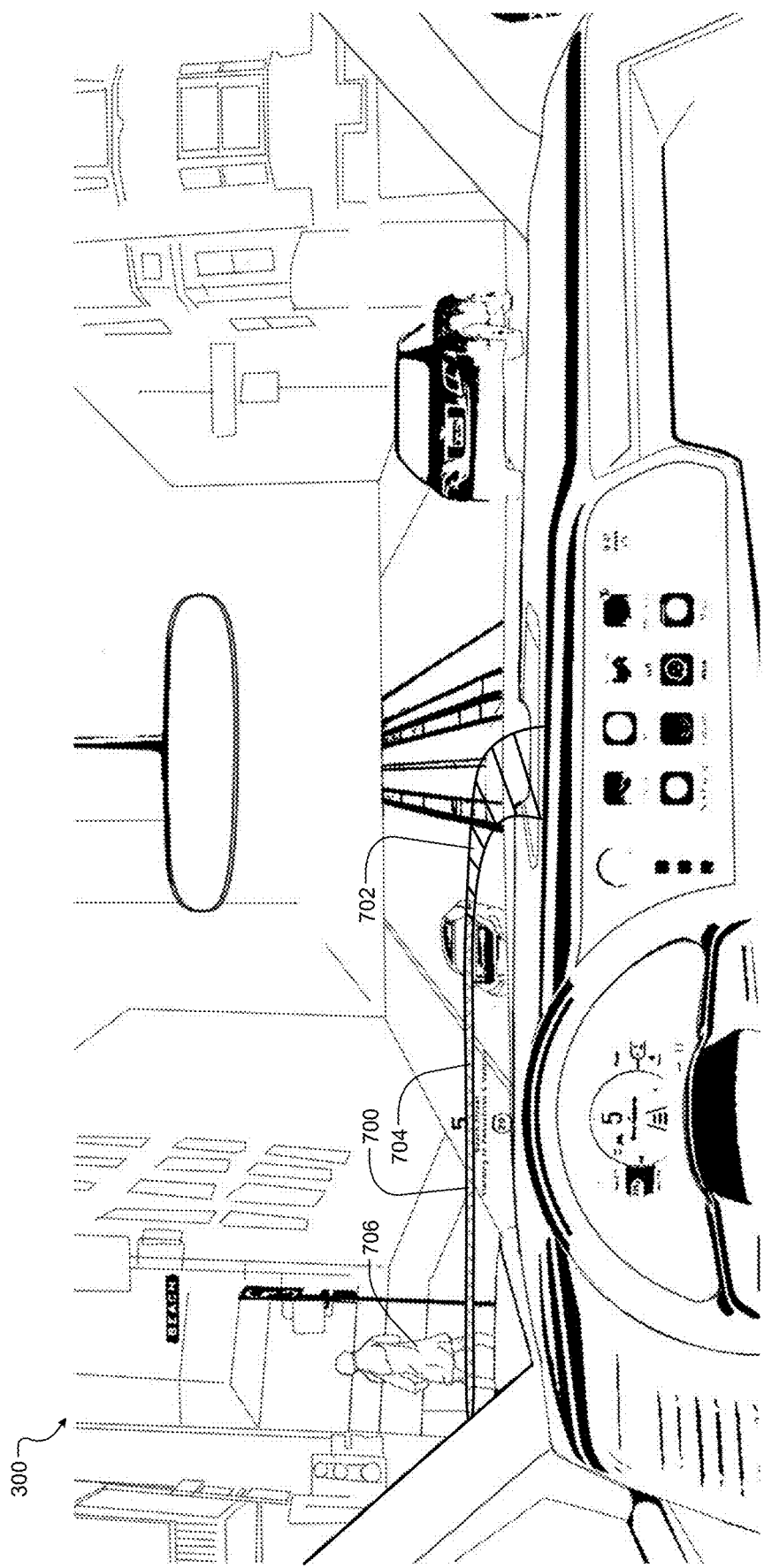
FIG. 7 is a perspective view of the example interior of FIG. 3 where the ARHUD is displaying an image indicative of a tentative vehicle path with different portions indicative that the host vehicle is to yield in accordance with the present disclosure.

FIG. 6 shows the interior 300 and the ARHUD is displaying another example closed digital gateway 602, the object highlighting features 311, 502, and other information. FIG. 7 shows the interior 300 and the ARHUD is displaying an image 700 indicative of a tentative vehicle path with different portions 702, 704 indicative that host vehicle is to yield. The different portions 702, 704 may be different colors and/or have different patterns. For example, portion 702 may be blue in color and portion 704 may be red in color indicating the host vehicle is planning to yield to a detected object, such as the pedestrian 706. The image 700 may be implemented as a digital gateway and/or another digital gateway may be displayed such as that shown in FIG. 3 or 6.

Figure 8A:
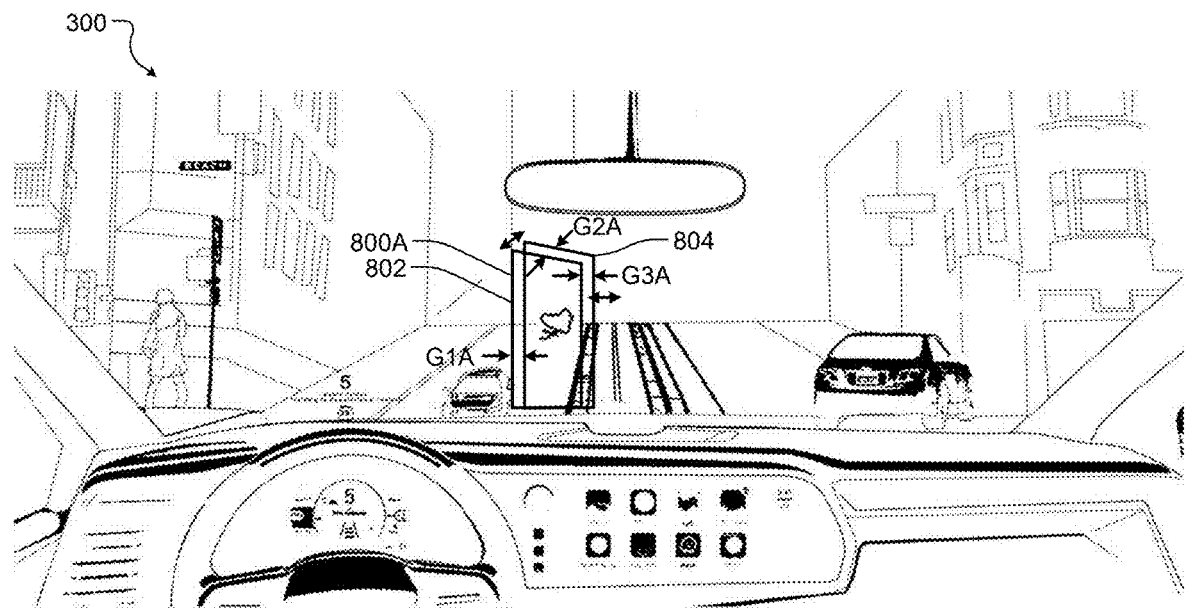
FIGS. 8A and 8B are perspective view of the example interior of FIG. 3 where the ARHUD is displaying different states of a changing closed digital gateway in accordance with the present disclosure.
Figure 8B:
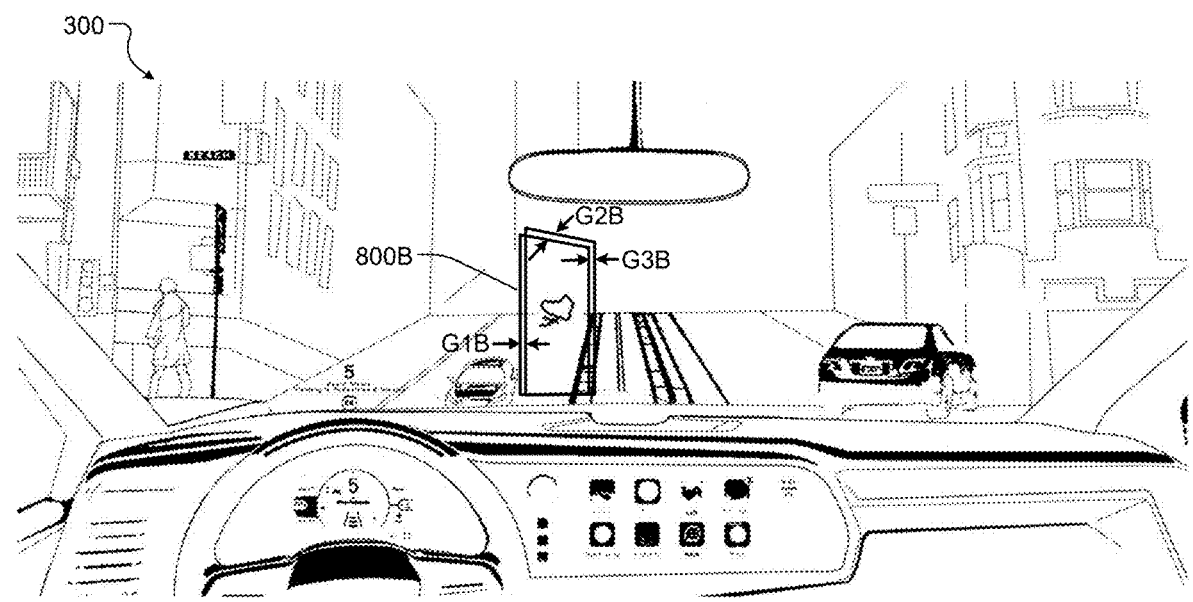

FIGS. 8A and 8B show the interior 300 and the ARHUD is displaying different states of a changing closed digital gateway 800, designated 800A and 800B. The digital gateway 800 is shown having two overlapping trapezoids 802, 804. In FIG. 8A, gaps G1A, G2A, G3A between side edges of the trapezoids 802, 804 are larger than gaps G1B, G2B, G3B between side edges of the trapezoids 802, 804 shown in FIG. 8B. The corresponding AR module may iteratively change relative location of one or more of the trapezoids 802, 804 such that one or more of the trapezoids 802, 804 appears to be moving back and forth relative to the other one of the trapezoids 802, 804.

Figure 9:
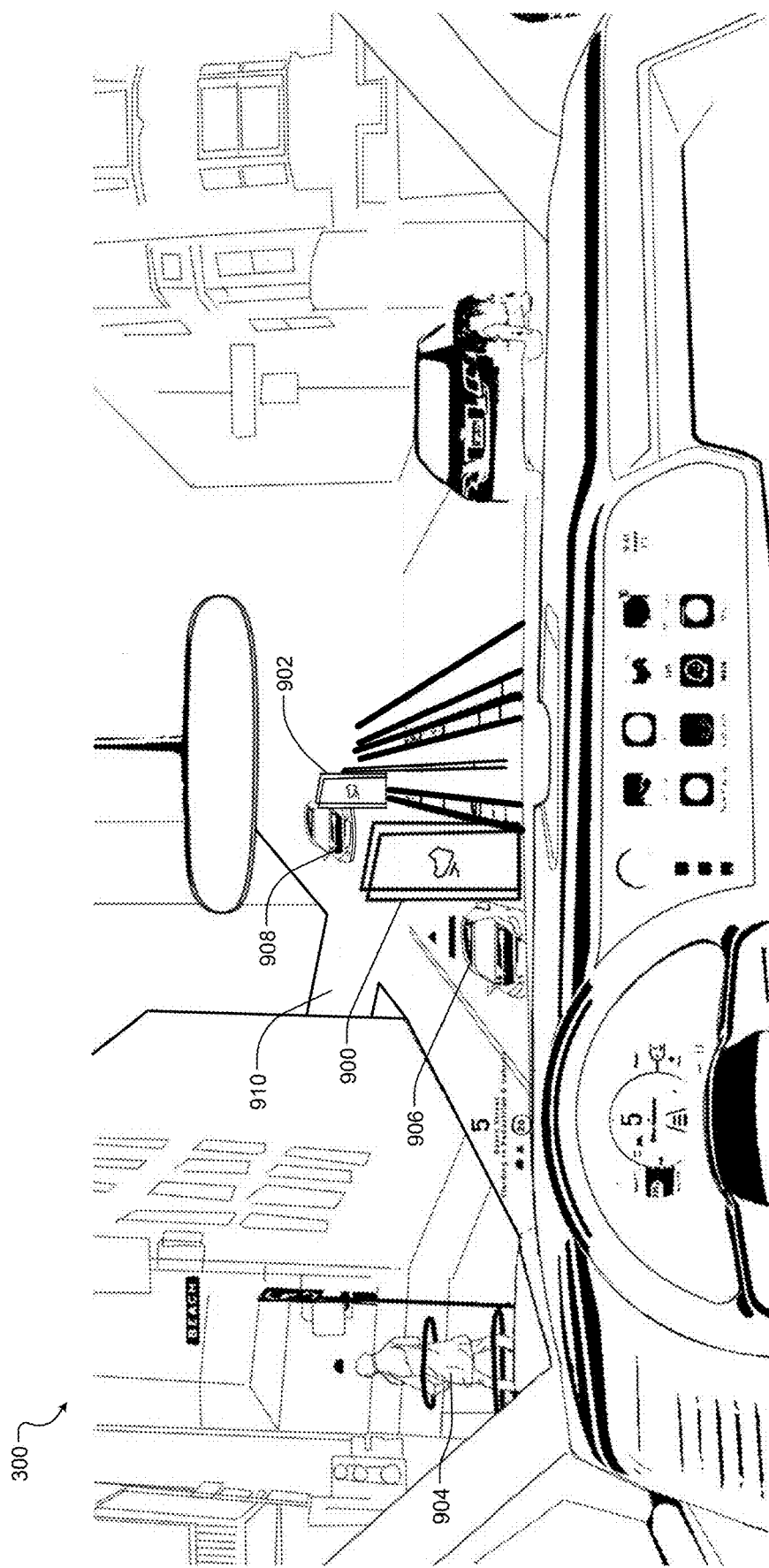
FIG. 9 is a perspective view of the example interior of FIG. 3 where the ARHUD is displaying multiple digital gateways in accordance with the present disclosure.

FIG. 9 shows the interior 300 and the ARHUD is displaying multiple digital gateways 900, 902. The digital gateways 900, 902 may be associated with two different possible paths of the host vehicle. In the example shown, the digital gateways 900, 902 are associated with left turns onto respective streets. Any number of digital gateways may be shown. The digital gateway 900 may indicate the current and/or planned yielding status of the host vehicle for a currently planned route (or path). The digital gateway 902 may indicate a future yielding status for the currently planned route or indicate a yielding status should the host vehicle follow a route that is different than the currently planned route. The host vehicle may be currently yielding and waiting at a traffic light before making a left turn near a pedestrian 904, may be yielding due to the oncoming vehicle 906, or may be yielding because of both the pedestrian 904 and the oncoming vehicle 906. Thus, the host vehicle may turn left near the pedestrian 904 (first route) or may drive further to a next street where vehicle 908 is currently shown and make a left turn at street 910 (second route).

Figure 10A:
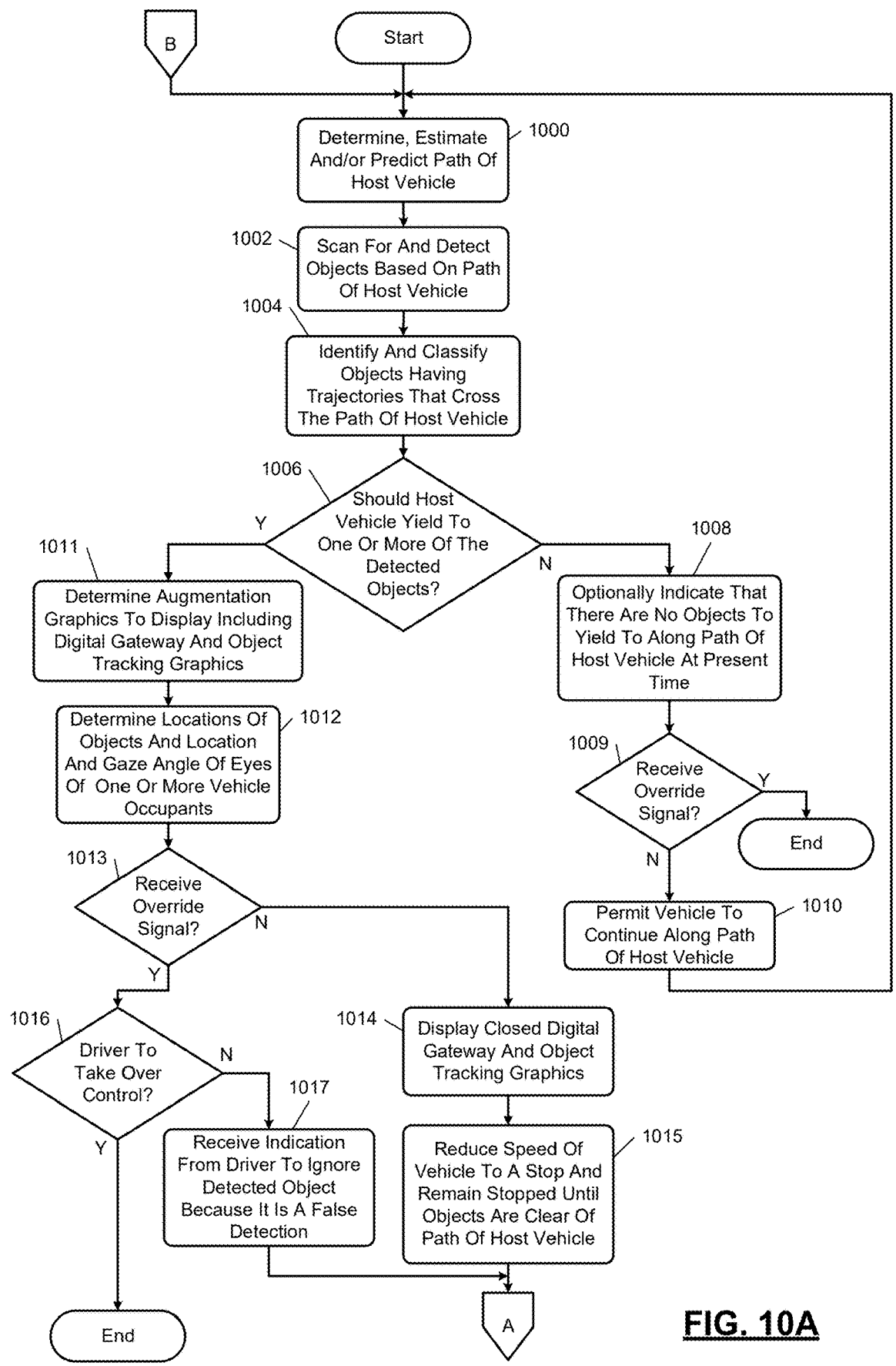
FIGS. 10A and 10B (collectively FIG. 10) illustrate a method of operating an ADAS in accordance with the present disclosure.
Figure 10B:
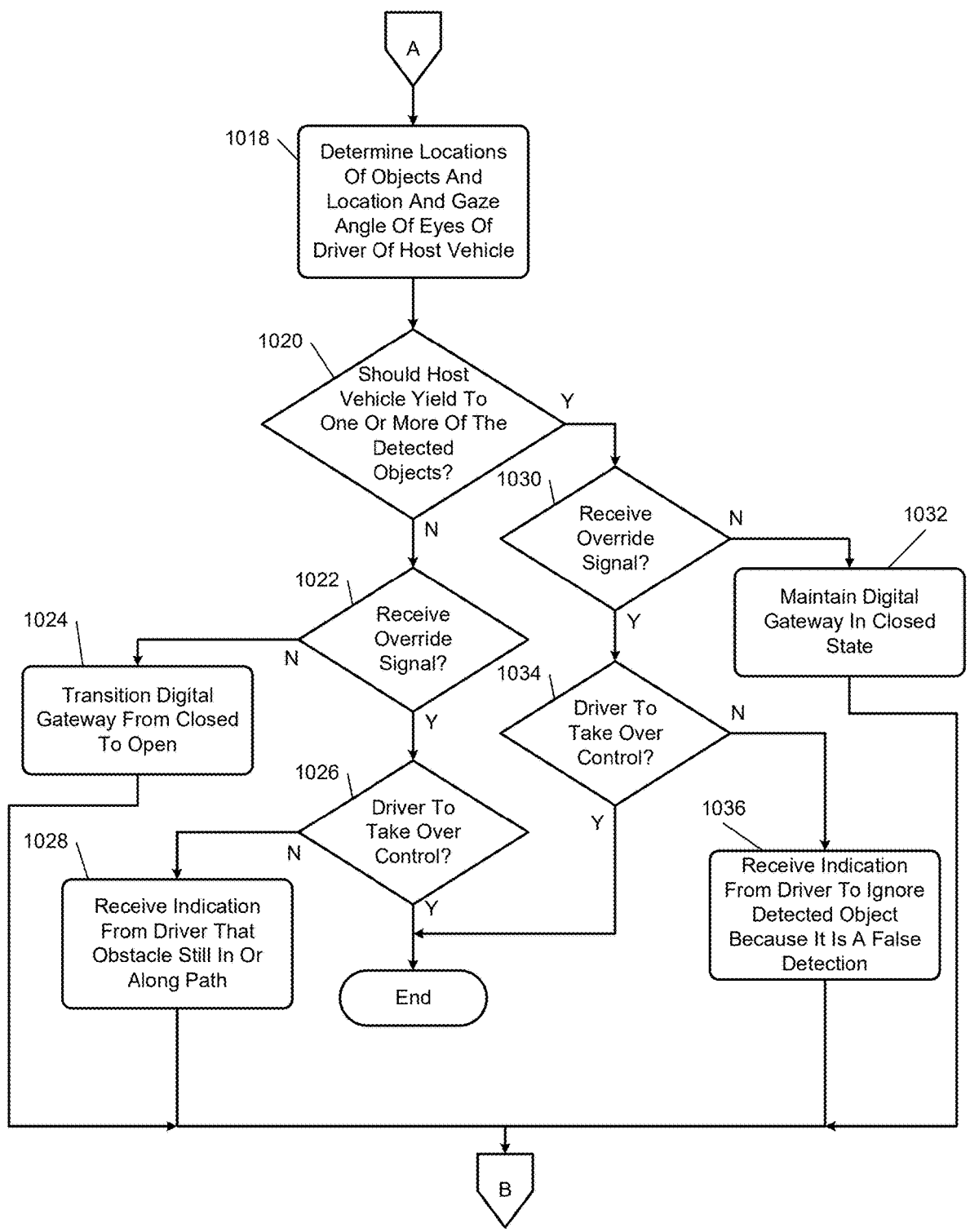

FIG. 10 shows a method of operating an ADAS (e.g., the ADAS 101 of FIG. 1). The following operations may be iteratively performed. At 1000, an AR module (e.g., the AR module 102 of FIGS. 1-2) determines, estimates and/or predicts a path of a host vehicle.

At 1002, the AR module scans for and detects objects based on the path of the host vehicle. This may include detecting objects having trajectories that cross the path of the host vehicle.

At 1004, the AR module may identify and classify the detected objects. The AR module may determine types and trajectories of objects located within a predetermined range of the intended forward-facing pathway of the host vehicle. The AR module may use cloud computing, V2V communication, V2X communication, and/or other communicating techniques to share object and vehicle speeds, headings, and other intentions of surrounding objects. The AR module may receive this information from one or more mobile network devices (e.g., mobile phones, wearable devices, etc.) external to the host vehicle.

At 1006, the AR module determines whether the host vehicle should yield for one or more of the objects. If no, operation 1008 may be performed, otherwise operation 1012 may be performed.

At 1008, the AR module optionally indicates that there are no objects along the path of the host vehicle at the present time. This may be a text message, an icon, and/or other message and/or image indicating the same. The message and/or image may be displayed over an environment forward of the windshield of the host vehicle, as described herein.

At 1009, the AR module may determine whether an override signal (e.g., driver override signal) has been received. The override signal may be a brake pedal signal, an accelerator pedal signal, and/or other signal generated based on an input from the driver or other vehicle occupant. If yes, the method may end, otherwise operation 1010 may be performed.

At 1010, the AR module permits the vehicle to continue along the path of the host vehicle.

At 1011, the AR module determines augmentation graphics to display including digital gateway and object tracking graphics. This may include any of the closed digital gateways and object highlighting features disclosed herein.

At 1012, the AR module may determine locations and gaze angles of eyes of one or more vehicle occupants (e.g., the driver). The AR module may identify locations of driver's eyes and determine locations for augmented reality graphics including digital gateways and graphics to highlight locations of surrounding objects. The AR module may calculate image type, size and location required for ARHUD/full windshield display (or AR cluster display). The AR module may generate, project, and continually update virtual images.

At 1013, the AR module determines whether an override signal (e.g., driver override signal) has been received. The override signal may be a brake pedal signal, an accelerator pedal signal, and/or other signal generated based on an input from the driver or other vehicle occupant. If no, operation 1014 may be performed, otherwise operation 1016 may be performed.

At 1014, the AR module may display a closed digital gateway and object tracking graphics.

At 1015, a vehicle control module (e.g., the vehicle control module 103 of FIGS. 1-2) may reduce speed of the vehicle to a stop. The host vehicle may remain stopped until objects are clear of the path of the host vehicle. Operation 1018 may be performed after the vehicle is stopped.

At 1016, the AR module may determine whether the driver is to take over driving control of the vehicle. The driver may provide a verbal indication, a gesture, and/or other input, for example, via a touchscreen or other input device whether the driver intends to take over control. The driver may simply continue pressing a pedal of the host vehicle indicating that the driver intends to take over control. If yes, the method may end, otherwise operation 1017 may be performed.

At 1017, the AR module may receive an indication from the driver that the detected object is a false detection and/or is not an object of concern, thus indicating to continue along path. This indication may be provided by the driver verbally, using a gesture, via a touchscreen, and/or via another input device and/or interface. Operation 1018 may be performed subsequent to operation 1017.

At 1018, the AR module may get an update on locations and gaze angles of eyes of one or more vehicle occupants (e.g., the driver). This may occur at any point in time during the method of FIG. 10. The AR module may generate, project, and continually update virtual images.

At 1020, the AR module determines whether the host vehicle should continue to yield for one or more of the objects. If no, operation 1022 may be performed, otherwise operation 1030 may be performed.

At 1022, the AR module determines whether an override signal (e.g., driver override signal) has been received. The override signal may be a brake pedal signal, an accelerator pedal signal, and/or other signal generated based on an input from the driver or other vehicle occupant. If no, operation 1024 may be performed, otherwise operation 1026 may be performed.

At 1024, the AR module transitions the closed digital gateway to an open digital gateway. The open digital gateway may be any of the open digital gateways disclosed herein.

At 1026, the AR module may determine whether the driver is to take over driving control of the host vehicle. The driver may continue pressing a pedal and/or provide a verbal indication, a gesture, and/or other input, for example, via a touchscreen or other input device whether the driver intends to take over control. If no, operation 1028 may be performed, otherwise the method may end.

At 1028, the AR module may receive an indication from the driver that the obstacle is still in or along the path of the vehicle and thus the vehicle should not continue along the path. This indication may be provided by the driver verbally, using a gesture, via a touchscreen, and/or via another input device and/or interface.

At 1030, the AR module determines whether an override signal (e.g., driver override signal) has been received. The override signal may be a brake pedal signal, an accelerator pedal signal, and/or other signal generated based on an input from the driver or other vehicle occupant. If no, operation 1032 may be performed, otherwise operation 1034 may be performed.

At 1032, the AR module may maintain display of the closed digital gateway.

At 1034, the AR module determines whether the driver is to take over control. The driver may continue pressing a pedal and/or provide a verbal indication, a gesture, and/or other input, for example, via a touchscreen or other input device whether the driver intends to take over control. If no, operation 1032 may be performed, otherwise operation 1034 may be performed.

At 1036, the AR module may receive an indication from the driver that the detected object is a false detection and/or is not an object of concern, thus indicating to continue along path. This indication may be provided by the driver verbally, using a gesture, via a touchscreen, and/or via another input device and/or interface.

Operation 1000 may be performed subsequent to operations 1024, 1028, 1032, 1036.

The above-described examples provide situation awareness to promote trust and assist takeover decisions in a highly automated vehicle. The disclosed ADAS uses computer vision, machine learning and cloud computing to identify and communicate scenarios where a moving autonomous host vehicle should yield to pedestrian(s), obstructed roadway, and/or oncoming (right-of-way) traffic. Based on real-time vehicle sensing of the driving environment, the vehicle presents the driver with visual indication of real-time presence and intended direction of pedestrians, roadway obstructions and right-of-way traffic using an ARHUD. Vehicle perceives the road ahead with sensing devices (e.g., camera, radar and/or lidar) and V2X communication. Computer vision, machine learning and V2X communication are used to classify types and trajectory of obstacles located within range of the intended pathway of the host vehicle. When the vehicle sensors detect a pedestrian, oncoming right-of-way traffic or roadway obstruction, the ARHUD displays a graphic indicator for each obstacle. In the instance that the host vehicle should yield to right-of-way obstacles, a closed digital gateway is displayed via the ARHUD in the driver or passenger's line of site.

In an embodiment and as the host vehicle approaches the closed digital gateway, the digital gateway pulses indicating the digital gateway is temporarily closed. As a result, the host vehicle yields until its pathway is clear to proceed. Once right-of-way obstacles have cleared the host vehicle's pathway, the pulsing digital gateway then uncouples and turns green. This new state indicates that the digital gateway is now open and the host vehicle can and/or will proceed along its originally intended pathway. This method provides enhanced situation awareness and provides a vehicle occupant with a visualization in real-time consideration of pedestrians, roadway obstructions, and oncoming traffic that may not otherwise be evident.

The disclosed examples improve driving safety and convenience, increase situation awareness and user confidence, and provide situation awareness in automated driving modes to increase user trust and aid in vehicle take-over of driving control.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C #, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. An assistance system comprising:
    an augmented reality circuit configured to i) determine a path of a host vehicle, ii) detect one or more objects with one or more trajectories predicted to interfere with the path of the host vehicle, and iii) based on the one or more trajectories, generate a first digital gateway indicative that the host vehicle should yield for the one or more objects;
    a display control circuit configured to control an augmented reality head-up display to display the first digital gateway in a closed state over an environment forward of the host vehicle and along the path of the host vehicle; and a vehicle control circuit configured to yield to the one or more objects as the host vehicle approaches the first digital gateway.

2. The assistance system of claim 1, wherein the augmented reality circuit is configured to i) collect data regarding the one or more objects from one or more exterior sensors and via at least one of vehicle-to-everything (V2X) communication, communication with a cloud-based network device, communication with a back office, communication with a mobile device, and ii) detect the one or more objects based on the collected data.

3. The assistance system of claim 1, wherein:
the augmented reality circuit is configured to i) collect data from one or more interior sensors, and ii) track location and gaze direction of eyes of a vehicle occupant based on the data; and
the display control circuit is configured to display the first digital gateway based on the location and gaze direction of the eyes of the vehicle occupant.

4. The assistance system of claim 1, wherein the augmented reality circuit is configured to detect when the path of the host vehicle is clear, and change the first digital gateway from a closed state to an open state indicating that the host vehicle is at least one of permitted to i) continue along the path, and ii) proceed along the path.

5. The assistance system of claim 4, wherein the augmented reality circuit is configured when changing state of the first digital gateway to change at least one of color, shape, image, orientation, pulsing state, and size of the first digital gateway.

6. The assistance system of claim 1, wherein the augmented reality circuit is configured to generate the first digital gateway to include multiple geometrical shapes that move relative to each other when the first digital gateway is in the closed state and do not move relative to each other when the first digital gateway is in an open state.

7. The assistance system of claim 1, wherein:
the augmented reality circuit is configured to generate one or more images to highlight the one or more objects; and
the display control circuit is configured to display the one or more images via the augmented reality head-up display.

8. The assistance system of claim 1, wherein the first digital gateway is in a shape of at least one of an accelerator pedal and a brake pedal.

9. The assistance system of claim 1, wherein:
the first digital gateway is in an image of representative of the path; and
the image has at least one of different colored sections, different shaded sections, and different patterned sections to indicate where along the path to move forward and where along the path not to move forward and thus the host vehicle yields to the one or more objects.

10. The assistance system of claim 1, wherein:
the augmented reality circuit is configured to determine another possible path for the host vehicle, and generate second digital gateway associated with the another possible path; and
the display control circuit is configured to display the second digital gateway while displaying the first digital gateway.

11. The assistance system of claim 1, wherein the augmented reality circuit is configured to receive an override signal, and based on the override signal, i) cease displaying the first digital gateway, or ii) select or change a state of the first digital gateway.

12. An assistance method comprising:
determining a path of a host vehicle;
detecting one or more objects with one or more trajectories predicted to interfere with the path of the host vehicle;
based on the one or more trajectories, generating a first digital gateway indicative that the host vehicle should yield for the one or more objects;
controlling an augmented reality head-up display to display the first digital gateway in a closed state over an environment forward of the host vehicle and along the path of the host vehicle; and
yielding to the one or more objects as the host vehicle approaches the first digital gateway.

13. The assistance method of claim 12, further comprising:
collecting data regarding the one or more objects from one or more exterior sensors and via at least one of vehicle-to-everything (V2X) communication, communication with a cloud-based network device, communication with a back office, communication with a mobile device; and
detecting the one or more objects based on the collected data.

14. The assistance method of claim 12, further comprising:
collecting data from one or more interior sensors, and ii) track location and gaze direction of eyes of a vehicle occupant based on the data; and
displaying the first digital gateway based on the location and gaze direction of the eyes of the vehicle occupant.

15. The assistance method of claim 12, further comprising detecting when the path of the host vehicle is clear, and changing the first digital gateway from a closed state to an open state indicating that the host vehicle is at least one of permitted to i) continue along the path, and ii) proceed along the path.

16. The assistance method of claim 15, wherein changing state of the first digital gateway comprises changing at least one of color, shape, image, orientation, pulsing state, and size of the first digital gateway.

17. The assistance method of claim 12, further comprising generating the first digital gateway to include multiple geometrical shapes that move relative to each other when the first digital gateway is in the closed state and do not move relative to each other when the first digital gateway is in an open state.

18. The assistance method of claim 12, further comprising:
generating one or more images to highlight the one or more objects; and
displaying the one or more images via the augmented reality head-up display.

19. The assistance method of claim 12, wherein the first digital gateway is in a shape of at least one of an accelerator pedal and a brake pedal.

20. The assistance method of claim 12, wherein:
the first digital gateway is in an image of representative of the path; and
the image has at least one of different colored sections, different shaded sections, and different patterned sections to indicate where along the path to move forward and where along the path not to move forward and thus the host vehicle yields to the one or more objects.

* * * * *